Figure 1:
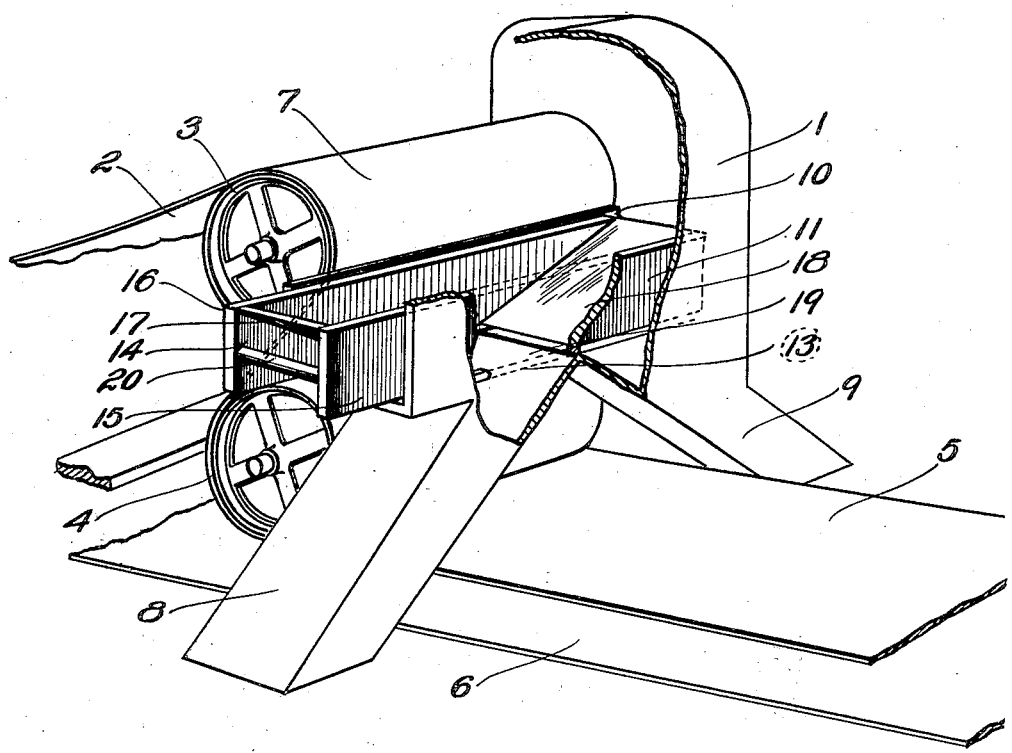

H. W. DAVISSON.
GRAIN CHUTE.
APPLICATION FILED FEB. 18, 1921.

1,428,763.

Patented Sept. 12, 1922.

INVENTOR
Harry W. Davisson.
By Arthur C. Brown
ATTORNEY

Patented Sept. 12, 1922.

1,428,763

UNITED STATES PATENT OFFICE.

HARRY W. DAVISSON, OF KANSAS CITY, MISSOURI, ASSIGNOR OF ONE-HALF TO JAMES C. PATRICK, OF KANSAS CITY, MISSOURI.

GRAIN CHUTE.

Application filed February 18, 1921. Serial No. 445,947.

*To all whom it may concern:*

Be it known that I, HARRY W. DAVISSON, a citizen of the United States, residing at Kansas City, in the county of Jackson and State of Missouri, have invented certain new and useful Improvements in Grain Chutes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a grain delivery device and particularly to delivery devices in which there are a plurality of chutes for conveying grain in different directions.

The invention contemplates means for valving one chute while opening another chute and the invention consists in certain parts and novel arrangements of parts to be described hereinafter.

Figure 2:
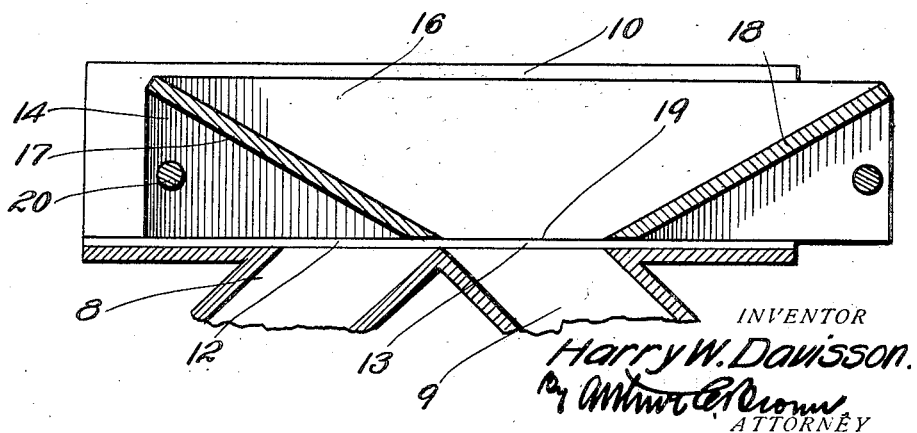

In the drawings,

Fig. 1 is a view partly in perspective and partly in section of a trip and means for valving the delivery chutes thereof, and Fig. 2 is a vertical, cross sectional view through a pair of chutes and through the valving means.

In the nomenclature of the art the mechanism at the end of the grain flight which delivers the grain into the storage bins is termed generically a "trip." In the present instance I have shown the trip as consisting of a casing 1, extending entirely across the conveyor belt 2 to enclose the delivery end thereof. The delivery end of the belt 2 passes over a pulley 3 and around a pulley 4 below the same, and then around another pulley (not shown) so that the portion 5 may be supported and whereby the belt may be returned, the return flight being shown at 6.

The means for driving the belt is immaterial, so it is thought unnecessary to describe it here.

The delivery end 7 of the belt empties into the trip casing 1 having at its lower end oppositely inclined spouts or chutes 8 and 9, adapted to discharge into storage bins on opposite sides of the belt 2. The storage bins are generally arranged on opposite sides of the belt and the trip is adjustable along the belt 2 so that it may be moved over the bins to discharge into the tops thereof.

Various means have been used to close one spout while opening the other but my invention acomplishes the desired result in an inexpensive and efficient manner.

The trip casing 1 is provided with an upstanding wall 10, parallel with an outer wall 11 to form a trough into which the grain discharges before passing through either of the spouts or chutes 8 or 9. The bottom of the trough is open, as at 12, and bridging said opening are two strips or guides 13, upon which may slide the vertical walls 14 and 15 of a valving hopper 16. The valving hopper is shown as comprising the walls 14 and 15 and inclined bottom members 17 and 18, spaced apart at their lower ends to provide a hopper discharge opening 19, approximately co-extensive with the respective areas of the chutes 8 and 9. The walls 14 and 15 carry a handle or handles 20, whereby the operator may slide the sliding valve device 16 over the rails 13 to cause the opening 19 to register with the opening in either the chute 8 or 9. When the opening 19 is registering with one chute 8 or 9, the other is valved off, as will be clearly shown by reference to Fig. 2, it being understood that the length of the hopper sliding device is greater than the width of the belt; that is, it is intended to be the width of the belt plus the width of the opening of one of the chutes so that the hopper may have longitudinal movement in either direction and still have its effective length sufficient to receive all the grain discharged from the discharge end 7 of the belt 2.

It will be apparent from the foregoing that when the device is operating, as shown in Fig. 1, with the contents of the hopper discharging into the chute 8, the chute 9 will be closed off and grain will be directed into the bin on the left hand side of the trip. When, however, the reverse operation takes place, that is, when the opening 19 registers with the chute 9, the chute 8 will be valved off and the grain will be directed through the chute 9 to be deposited in the bin on the right hand side of the trip. Therefore, the direction of flow of the grain discharged from the belt 2 may be easily controlled by the operator through the medium of the handle 20.

What I claim and desire to secure by Letters-Patent is:

1. A grain delivery belt, a casing into which the delivery belt discharges, delivery chutes in spaced relation in the bottom of the casing, and a sliding hopper in the casing of greater length than the width of the belt and provided with a discharge opening adapted to register with either of the delivery chutes when the hopper is slid in either of two directions.

2. The combination with a traveling grain delivery trip having oppositely disposed grain delivery chutes in the bottom thereof and a conveyor discharging above the delivery chutes and in line therewith, of a hopper slidable transversely of the trip and having an edge adjacent to the discharge portion of the conveyor, the bottom of the hopper having an opening co-extensive with the opening of one of the chutes and said hopper being closed at the ends so that when the hopper is in alignment with one of the delivery chutes, the other delivery chute will be cut off from effective communication with the hopper and vice versa.

In testimony whereof I affix my signature.

HARRY W. DAVISSON.